Nov. 30, 1971  J. A. WAGLE  3,623,204

METHOD OF FABRICATING HOLLOW GAS TURBINE BLADES

Filed Feb. 2, 1970  3 Sheets-Sheet 1

INVENTOR
Joseph A. Wagle
BY
Peter P. Kozak
ATTORNEY

INVENTOR.
Joseph A. Wagle
BY
Peter P. Kozak
ATTORNEY

United States Patent Office 3,623,204
Patented Nov. 30, 1971

3,623,204
METHOD OF FABRICATING HOLLOW GAS TURBINE BLADES
Joseph A. Wagle, Indianapolis, Ind., assignor to General Motors Corporation, Detroit, Mich.
Filed Feb. 2, 1970, Ser. No. 7,627
Int. Cl. B23p *15/02, 15/04*
U.S. Cl. 29—156.8 H                10 Claims

ABSTRACT OF THE DISCLOSURE

A method for fabricating hollow, reinforced blades for use in gas turbine engines is disclosed wherein a skin layer preform is positioned against the die wall of a closed die, reinforcing support struts are placed within the preform and thin walled pressure tubes are inserted therebetween. The die is heated to 1500° F. whereafter a fluid is introduced into the heated tubes subjecting the walls thereof to a pressure of 12,000 p.s.i. whereby the tubes are deformed outwardly against and into intimate contact with the preform and struts. The fluid pressure and die temperature cooperate to effect a diffusion bond between the blade members thereby forming a hollow blade having reinforcing struts therein.

---

This invention relates to a method of fabricating precision hollow blades for use in gas turbine engines and, more particularly, to a closed die fabrication technique wherein the blades are formed by the cooperative action of internal pressurization and diffusion bonding of the blade members.

Large gas turbine fan-jets require long fan blades in order to obtain high by-pass ratios. The relatively large chord and airfoil thickness make hollow blades practical and desirable to reduce weight in the engine and to thereby gain efficiency. However, precision hollow blades are more expensive to fabricate than equivalent solid blades due to the relatively large amount of material, fabrication time, and complexities involved in fabricating these blades by conventional prior art techniques.

Accordingly, it is a principal object of my invention to provide a closed die method of fabricating a precision hollow blade whereby many of the inefficiencies and limitations found in conventional hollow blade forming techniques are eliminated.

It is another object of my invention to provide a blade fabricating technique which inherently provides a smoother contoured airfoil skin than can otherwise be achieved by conventional fabricating techniques, thereby increasing the aerodynamic efficiency of the blade and which provides a blade having superior bonded strength with no discontinuities due to fabrication which would act as stress risers during engine operation.

It is a further object of my invention to provide a method of fabricating hollow blades wherein a variety of metals and alloys, including metal-filament composites, and a variety of blade support structures, including a dovetail root portion, may be easily incorporated in the blade during fabrication and diffusion bonded thereto.

The application of the fabricating method of my invention basically involves the use of a closed die capable of being evacuated and having die forming surfaces conforming to the external configuration of the blade desired to be formed. In a preferred embodiment of my invention, an airfoil skin preform is placed in the die against the die forming surfaces. The airfoil skin, as referred to herein, is the outer surface portion of the airfoil of the blade and can be made of various types of sheet metal including aluminum, titanium, and alloys thereof, stainless steel and various filament composites such as boron, boron silicate and boron nitride filaments dispersed in a titanium or aluminum metal matrix.

After placing the airfoil skin in the die, the skin is brought into contact with the die forming surfaces thereby forming a desired airfoil configuration. Support struts are preferably placed in the cavity between the inner skin surfaces. In accordance with a basic aspect of the invention, thin-walled metal pressure tubes are positioned in the voids formed between the struts. The die is now evacuated and heated to an elevated temperature which is below the melting point of the blade forming members, whereby the blade forming members reach the die temperature.

After the proper temperature has been achieved, a fluid is introduced into the heated tubes subjecting the walls thereof to high pressure whereby the tubes are deformed outwardly against and into intimate contact with the inner surface of the airfoil skin and with the struts. The pressure and temperature are maintained for a time sufficient for all the members to bond together by diffusion after which the pressure is released, the die cooled, and the bonded blade removed.

As a result of the internal pressurization and diffusion bonding of the blade portions in the enclosed die, as embodied herein, a superior article characterized by a high degree of precision and excellent bonded strength is produced. The advantages over conventional forming techniques of my process lie in the elimination of many costly processes and steps thereby reducing the cost of the blade while providing a unitary construction superior in many respects.

My process is also characterized by a degree of versatility not only in the materials which may be employed and the blade configurations made, but also in the various blade supports which may be added to and formed with the blade. For example, a dovetail root portion or a bumper can be bonded to the blade during fabrication whereby, with a minimum of machining, a finished article, ready for assembly in an engine, is produced. In addition, a tip-to-root taper in the blade wall thickness can be easily provided for.

Other objects and advantages of my invention will become apparent from the following detailed description, reference being had to the accompanying drawings of which:

Figure 1:
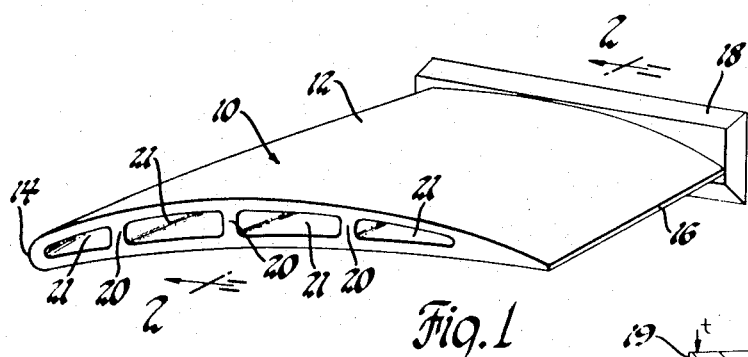
FIG. 1 is a schematic illustration of a blade configuration applicable to fabrication by the process embodying my invention.

Referring now to FIG. 1, there is shown in general, a blade for use in gas turbine engines including an airfoil portion 10 having a skin layer 12, a leading edge 14, a trailing edge 16 and attached to a dovetail root joint 18. The root joint 18 is used to attach the blade to a hub in a gas turbine engine whereby the long axis of the blade lies along the radial axis of the hub. The skin portion 12 of the airfoil may be formed of a variety of metals and alloys including metal-filament composites. A composite material particularly applicable to this invention comprises a large number of boron filaments dispersed and held in a titanium or aluminum metal matrix and having major portions of the filaments aligned parallel to the primary stress axis of the blade to prevent elongation of the blade with some of the filaments aligned at various other angles to provide necessary torsional stiffness. The use of a metal-filament composite airfoil skin in a hollow blade is desirable to provide stiffness in the blade especially against torsional forces which is particularly important as blade length increases as in long fan blades.

The blade 10 also includes a plurality of support struts 20 interiorly of the blade and aligned parallel to its radial axis which support the airfoil skin adding strength to the blade and which define passages 21 therebetween for either circulation of a cooling fluid during engine operation or for containing a vibration dampening compound such as an epoxy or rubber. In blades of this type, it is also desirable to provide a variable tip-to-root taper in the blade wall thickness. As may be seen in FIG. 2, a typical taper is from a thickness $t$ at the tip portion 19 to $2t$ in the root portion of the blade. A typical value of $t$ is 0.020 inch.

The general process of this invention involves the fabrication of an airfoil blade by a closed die method in which the blade components are forced into intimate contact with each other by internal pressurization within the airfoil and diffusion bonded together. The use of a closed die provides for precision fabrication of a blade reproducible from blade to blade.

Figure 3:
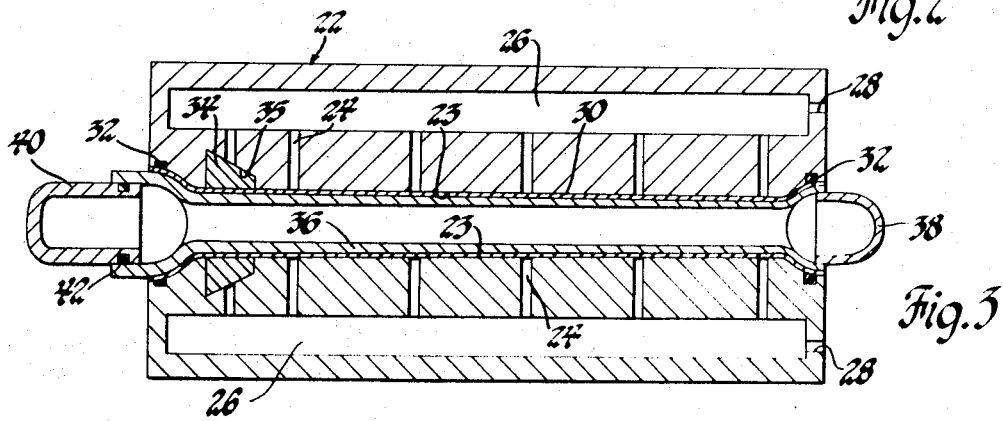
FIG. 3 is a schematic cross-sectional illustration of the apparatus of one embodiment of my invention taken along line 3—3 of FIG. 4.

Referring to FIG. 3 there is shown one embodiment of fabricating blades by this method. A closed die 22 is provided having precision die forming surfaces 23 corresponding to the outer configuration of the airfoil portion of the blade which define a die cavity and having venting ports 24 communicating between the die cavity and chambers 26 which may be evacuated through ports 28 to provide for evacuation of the die cavity.

As a first step in the process, root portion inserts 34 of a desired configuration, such as a dovetail configuration, are placed in recesses 35 in the die wall having corresponding configurations so that their inner surfaces are flush with the die forming surfaces 23. The outer airfoil skin 30 which is preformed to a shape corresponding generally to the shape of the airfoil is then placed in the die against the die forming surfaces 23 and urged into contact against the die surfaces by evacuating chamber 26 through ports 28. O-ring seals 32 are provided at each end of the die to prevent air from being drawn between the die surfaces and the preformed skin. A mold release agent is preferably provided on the die forming surfaces to facilitate removal of the blade from the mold.

Figure 2:
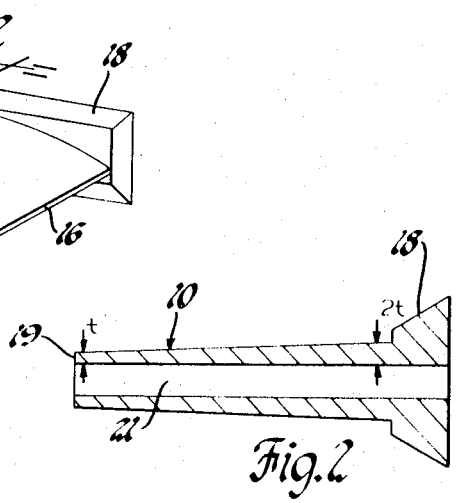
FIG. 2 is a view of FIG. 1 taken along line 2—2.
Figure 4:
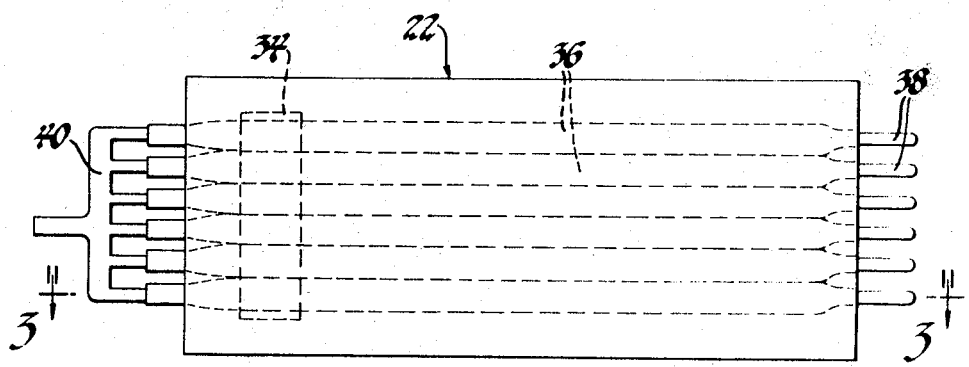
FIG. 4 is a top view of the apparatus illustrated by FIG. 3.

With the skin in contact with the die surfaces, a plurality of thin walled pressure tubes 36 are inserted into the interior void of the preform in side-by-side relationship, as shown by FIG. 4, with the longitudinal axes of the tubes being parallel to the longitudinal axis of the preform which corresponds to the radial axis of the blade being formed. The pressure tubes 36 are preferably tapered by a tapering extrusion process to provide a desired tip-to-root taper in the finished airfoil blade, as shown in FIG. 2. However, the airfoil preform may be tapered instead of the pressure tubes to provide the desired tip-to-root taper. One end of each tube is sealed with a plug 38 capable of remaining sealed under high pressures and the opposite ends thereof are attached to a manifold 40 which is connected to a source of fluid pressure (not shown). O-ring seals 42 are provided for sealing the connection between the pressure tubes 36 and the manifold 40.

With the blade members in the described position within the die, the die is locked closed and placed in a vacuum furnace after which it is heated to a temperature of about 1600° F. when the blade members are formed of a relatively high melting point metal, such as titanium. At this elevated temperature a fluid such as argon is introduced into the heated tubes to internally pressurize the tubes to a pressure of about 10,000 p.s.i. thereby subjecting the walls thereof to high pressure whereby all of the tubes are forced to expand against and into intimate contact with the preform and with each other, and the preform is forced against the die wall and the root joints with the entire structure being externally constrained by the nondeforming die. The fluid pressure acting on the tubes and temperature of the die are maintained for a time sufficient for the preform skin to diffusion bond to the root portion 34 and for the pressure tubes 36 to diffusion bond to the preform and to each other thereby forming an integral structure.

Diffusion bonding in general defines a welding technique without the presence of a liquid phase. The fluid pressure and die temperature cooperate to effect the bond which takes place by interdiffusion of atoms between the tightly mated parts. The time for bonding decreases with increased temperature and pressure. In order to form an effective bond, it is necessary to remove as much oxide as possible from the surface of the mating parts to allow for interdiffusion of the atoms to take place. The oxide is removed by chemical treatment or scratch brushing to an extent such that any oxide layer remaining will be broken up and extended when the parts are forced tightly together, thus permitting the intimate metal-to-metal contact necessary for interdiffusion of the atoms. In order to avoid oxidation of the blade members during heating, the members are heated in a vacuum.

After the blade members have been held at the elevated temperature and pressure previously recited for a time sufficient for diffusion bonding to take place, the die is cooled and pressure released, after which the composite blade is removed from the die. The finished blade having been constrained by the die is of precision size and shape and comprises a smooth, contoured outer airfoil skin attached to a root joint with the pressure tubes forming a tapered blade wall and blade support joints within the blade and defining passages therebetween for circulation of a coolant or for containing a vibration dampening compound. The blade may now be trimmed to the desired size, removing both the plug end and the pressurization end of the tubes. However, only a minimum amount of machining is necessary to prepare the blade for use and, therefore, only a minimum amount of processing and waste are involved in fabricating the blade.

A variation of the process previously described is accomplished by substituting sealed pressure tubes containing a fluid such as liquid hydrogen, water, argon, air or carbon dioxide for the pressure tubes and external pressurizing parts previously recited. In this case, the sealed tubes which again may have the desired taper, are placed in side-by-side relationship in the interior of the preform which is contained in a die having closed ends. The die is then locked and heated in a vacuum whereby the increased temperature causes the enclosed fluid to expand with a corresponding increase in pressure. A material found to be particularly suitable for developing a high isostatic pressure in sealed pressure tubes is lithium chloride which undergoes about a 30% increase in volume at about 1150° F. at which temperature a solid to liquid phase change occurs. Similar substances such as sodium chloride may be mixed with the lithium chloride to obtain a desired phase change temperature thereby controlling the temperature and pressure at which diffusion bonding takes place. In addition, since the volume of the material increases continuously above the phase change temperature, the pressure can be varied and controlled by controlling the heat input and output to the tubes. In the case of a gaseous pressurizing fluid, the required pressure may be generated by heating to an elevated temperature at which diffusion bonding takes place determined, approximately, by the formula: $T = P \times V/R$, where T is the absolute temperature, V is the volume of the tubes, P is the required pressure for diffusion bonding, and R is the universal gas constant. The die is held at this elevated temperature for a time sufficient for diffusion bonding to take place after which the blade is removed from the die and the pressure capsule ends are punctured to release the fluid.

Figure 5:
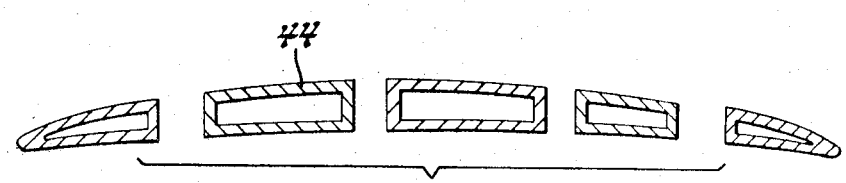
FIG. 5 is a schematic illustration of component parts employed in another embodiment of my invention.
Figure 6:
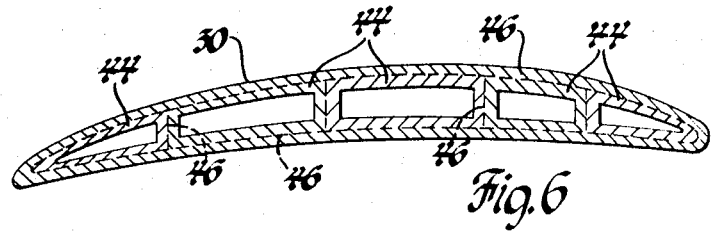
FIG. 6 is a schematic illustration of a blade when formed from the parts illustrated in FIG. 5, showing the regions of diffusion bonding between the component parts.

A second embodiment of my invention is illustrated in FIG. 5. In this embodiment, the airfoil preform and the root attachment member are placed in the die and urged against the die surface as previously described. Preformed support members 44 having a configuration defining generally to the internal configuration 21 of the blade and of the support members 20 as shown in FIG. 1, are inserted into the void in the preform and pressurized internally as in either of the previous embodiments at an elevated temperature for diffusion bonding to take place. The support members 44 may also be formed to a desired tip-to-root taper by extrusion. Since the supports are preformed into a shape corresponding to the finished blade, less expansion and deformation of the members is needed to bring all the surfaces into intimate contact. Use of the preformed support members provides a more interiorly integral blade than is usually achieved with the use of tubes with all surfaces in intimate contact and diffusion bonded together, as shown at 46 of FIG. 6.

Figure 7:
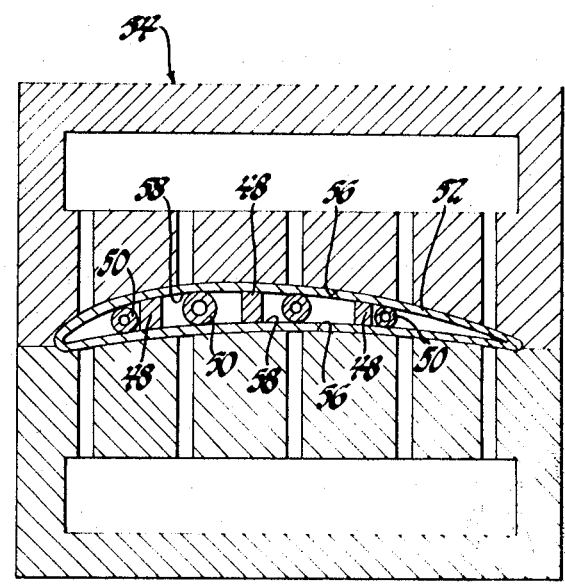
FIG. 7 is a schematic cross-sectional end view of the apparatus of a preferred embodiment of my invention.
Figure 8:
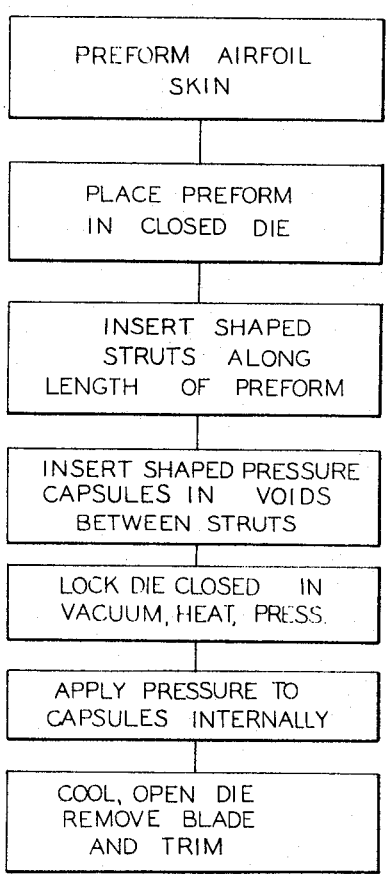
FIG. 8 is a flow diagram outlining the process steps involved in the embodiment illustrated by FIG. 7.
Figure 9:
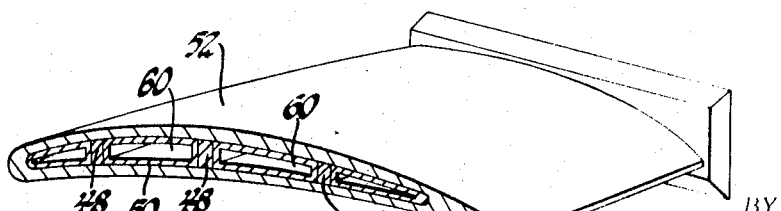
FIG. 9 is a schematic illustration of a finished blade fabricated by the embodiment illustrated by FIG. 7.

A third embodiment of my invention employs the basic method disclosed in the first described embodiment with the added feature of inserting support struts 48 between the thin-walled pressure tubes 50 to provide added support within the interior of the blade, as shown by FIG. 7. Referring to FIG. 8, the general process steps are outlined including forming a preform airfoil skin layer 52 which is placed within the closed die 54 and brought into contact with the die forming surfaces 56 and the root joint within the die wall. The shaped support struts 48 are then inserted at desired positions within the void of the preform having their longitudinal axes parallel to the longitudinal axis of the preform and having their transverse axes extending between the inner surfaces 58 of the preform and then shaped thin-walled pressure tubes 50 are inserted therebetween. The tubes may be either sealed with a fluid prior to insertion or may be attached to an external pressure system as previously described. The die is now locked closed, evacuated, and heated to the desired temperature in a vacuum at which time the tubes are pressurized internally expanding the tube walls against the inner surfaces 58 of the airfoil preform 52 and against the support struts 48. Temperature and pressure are maintained for a time sufficient for diffusion bonding to take place after which the bonded blade is removed. The finished blade has a configuration shown by FIG. 9 including an external airfoil skin 52 bonded to the support struts 48 and the pressure tubes 50; and the pressure tubes bonded to the support struts and defining passages 60 therebetween. As a result there is produced an integrally bonded blade structure ready for assembly in a turbine engine with a minimum amount of machining necessary.

Reference to the following specific example will further illustrate my method of fabricating blades for gas turbine engine applications. Although my invention contemplates the use of a plurality of pressure tubes in the airfoil skin void, the following example describes my method with reference to a single tube merely to simplify explanation and to illustrate my invention. It is to be understood that the references to the single tube are equally applicable to a plurality of tubes.

EXAMPLE

Figure 10:
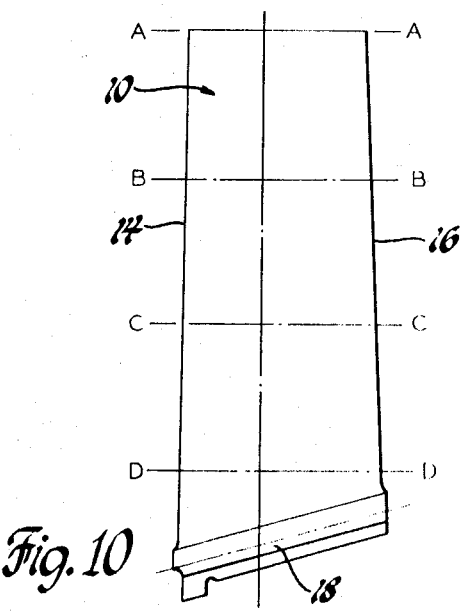
FIG. 10 is a plane view of the blades shown in FIG. 1 with sections referenced.

A closed die similar to that shown in FIG. 3 was provided having a die cavity corresponding to the shape of the blade to be formed and having recesses at one end of the die cavity for receiving a shaped dovetail root joint which was placed in the recesses so that its inner surfaces were flush with the die walls. The root joint was formed of titanium. The skin layer was shaped from rolled titanium sheet to form a preform having a thickness varying from 0.006 inch at line A—A, to 0.017 inch at line B—B, to 0.0224 inch at line C—C, to 0.032 inch at line D—D, as shown in FIG. 10, in order to provide a decreasing wall thickness from the root to the tip of the finished blade. The airfoil preform was placed in the die cavity and suction was applied through the die walls to bring the preform in contact therewith and to hold it in place.

A titanium tube 4.2 inches long, 0.75 inch in diameter, with a wall thickness of 0.006 inch was then preformed to conform generally to the shape of the airfoil preform void in a manner similar to the shaping of a plurality of tubes as shown in FIG. 5. The dimensions of the preformed tube were 1.18 inch chord, 4.2 inches radial axis length, and 0.05 inch maximum void thickness. The ends of the tube were sealed by welding with a spout being provided at one end. The tube was then filled through the spout to about 75% full with water or about 0.13 cubic inch, of water after which the spout was sealed by welding.

Figure 11:
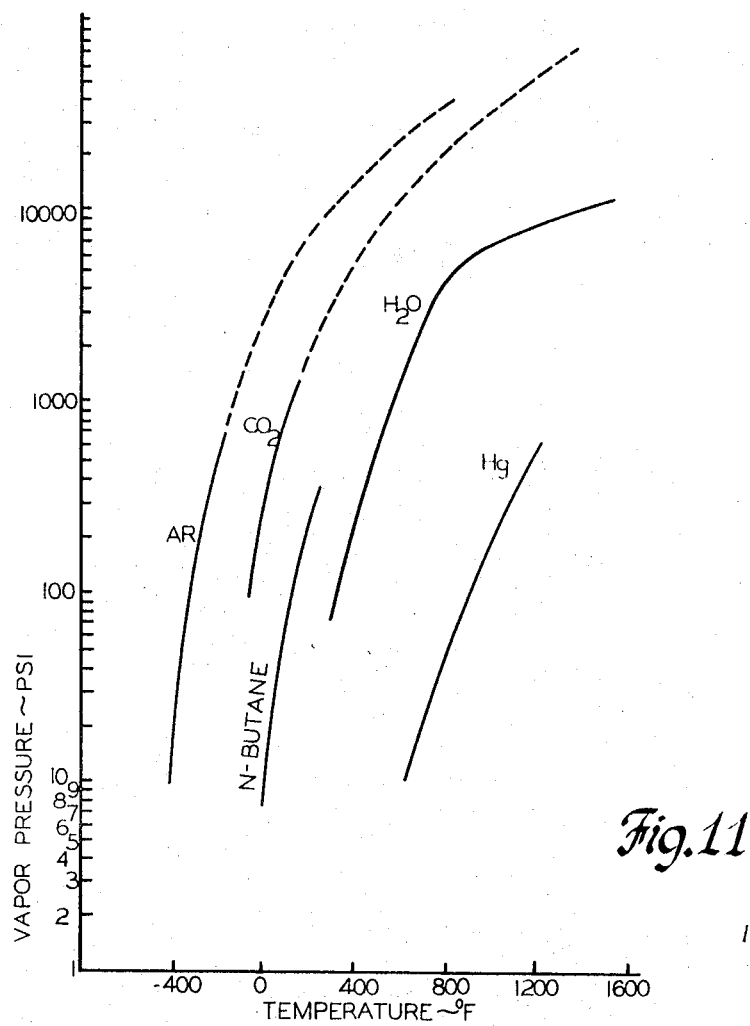
FIG. 11 is a graph of vapor pressure versus temperature for pressurizing fluids used in my invention.

The pressure tube having surface oxide removed, was then inserted in the airfoil preform void. The die was closed and locked in a press under a 30 ton load in a vacuum chamber. The die was heated to a temperature of about 1500° F. at which temperature a pressure of about 12,000 pounds per square inch is developed due to the volume expansion of the water on heating to an elevated temperature in a tube of fixed volume. FIG. 11 shows the increase in the vapor pressure of water with increased temperature and, in addition, shows the increase in vapor pressure with increased temperature of argon, carbon dioxide, N-butane, and mercury, which may be used instead of water depending on the temperatures and pressures required. The dashed portions of the argon and carbon dioxide curves are extrapolations from low temperature equations.

The temperature and pressure were maintained for about one hour to allow for diffusion bonding of the blade members to take place after which the die was allowed to cool for two hours. The bonded blade was then removed from the die, the pressure tube was punctured to drain the water, and the blade was trimmed to form the finished product. Table I lists the dimensions of the finished blade in terms of the sections shown in FIG. 10.

TABLE I

| Section | Maximum thickness, inch | Total section area, inch² | Void area, inch² | Maximum void thickness, inch | Solid area, inch² | Wall thickness, inch |
|---|---|---|---|---|---|---|
| A—A | 0.087 | 0.0724 | 0.044 | 0.063 | 0.0284 | 0.012 |
| B—B | 0.112 | 0.0975 | 0.044 | 0.066 | 0.0535 | 0.023 |
| C—C | 0.138 | 0.1130 | 0.044 | 0.0812 | 0.0670 | 0.0284 |
| D—D | 0.163 | 0.1323 | 0.044 | 0.087 | 0.0888 | 0.0:8 |

Note.—Total void volume = 0.176 cubic inch

The fact that blades formed by the subject process do not need extensive machining is particularly important where the skin is formed of a metal-filament composite. That is, typical prior art forming processes resulted in many of the filaments being cut and having their ends exposed at the surface of the blade which seriously detracted from the strength of the blade. In addition, forming by the subject process does not result in the presence of any stress risers which may contribute to early failure of the blade in operation as are commonly found in prior art forming processes.

Furthermore, since the blades are formed in a closed die under controlled temperature and pressure, precision size and blade contour can be maintained which is particularly important in view of the stress conditions found in current high speed engines and in order not to interrupt or disturb the desired flow conditions within the engine.

Although I have described my invention in terms of specific embodiments, it is to be understood that other forms may be adopted within the scope of the invention.

I claim:

1. A method of fabricating a hollow reinforced blade comprising the steps of:

providing a closed die having opposing die forming surfaces corresponding to the external configuration of said blade, providing a skin layer metal preform corresponding generally to the configuration of said die forming surfaces and having internally opposing surfaces, positioning said preform against said forming surfaces, inserting a plurality of thin walled metal tubes between said opposing surfaces of said preform with the longitudinal axes of said tubes being parallel to the longitudinal axis of said preform, heating said die to an elevated temperature, said temperature being below the melting point of said tubes and said preform, internally pressurizing said tubes whereby said tubes expand against and into intimate contact with said opposing surfaces of said preform, and maintaining the temperature and pressure for a time sufficient for said tubes to diffusion bond to said skin layer preform thereby forming a blade having a plurality of spaced supports extending between and bonded to said opposing surfaces of said preform with said tubes forming at least a portion of said supports and defining passages therebetween.

2. The method of claim 1 wherein said elevated temperature is about 1600° F. and said pressure is about 12,000 pounds per square inch, and wherein said tubes and said preform are formed of titanium.

3. The method of claim 1 wherein said skin layer preform is formed of a metal chosen from the group consisting of titanium and aluminum and alloys thereof, having boron filaments disposed and aligned therein.

4. A method of fabricating a hollow reinforced blade characterized by a uniform taper of blade wall thickness from the tip to the root thereof comprising the steps of:

providing a closed die having opposing die forming surfaces corresponding to the external configuration of said blade, providing a skin layer metal preform corresponding generally to the configuration of said die forming surfaces and having internally opposing surfaces, positioning said preform against said forming surfaces, inserting a plurality of thin walled metal tubes having a first end and an opposite end between said opposing surfaces of said preform with the longitudinal axes of said tubes being parallel to the longitudinal axis of said preform, said tubes having a uniformly increasing wall thickness from said first end to said opposite end, said first end being located at the tip portion of said preform, heating said die to an elevated temperature, said temperature being below the melting point of said tubes and said preform, internally pressurizing said tubes whereby said tubes expand against and into intimate contact with said opposing surfaces of said preform, and maintaining the temperature and pressure for a time sufficient for said tubes to diffusion bond to said skin layer preform thereby forming a blade having a tapered blade wall and having a plurality of spaced supports extending between and bonded to said opposing surfaces of said preform with said tubes forming at least a portion of said supports and defining passages therebetween.

5. A method of fabricating a hollow reinforced blade comprising the steps of:

providing a closed die having opposing die forming surfaces corresponding to the external configuration of said blade, providing a skin layer metal preform corresponding generally to the configuration of said die forming surfaces and having internally opposing surfaces, positioning said preform against said forming surfaces, inserting between said opposing surfaces of said preform a plurality of metal support struts in spaced relationship to each other, said struts having longitudinal and transverse axes, said longitudinal axes being parallel to the longitudinal axis of said preform and said transverse axes extending between said opposing surfaces of said preform, inserting a plurality of thin walled metal tubes between said struts and said opposing surfaces of said preform, heating said die to an elevated temperature, said temperature being below the melting point of said tubes and said preform, internally pressurizing said tubes whereby said tubes expand against and into intimate contact with said opposing surfaces of said preform and with said struts, and maintaining the temperature and pressure for a time sufficient for said tubes to diffusion bond to said skin layer preform and to said struts thereby forming a blade having a plurality of spaced support struts extending between and bonded to said opposing surfaces of said preform and defining passages therebetween.

6. A method of fabricating a hollow reinforced blade comprising the steps of:

providing a closed die having opposing die forming surfaces corresponding to the external configuration of said blade, providing a skin layer metal preform corresponding generally to the configuration of said die forming surfaces and having internally opposing surfaces, positioning said preform against said forming surfaces, inserting a plurality of thin walled metal tubes between said opposing surfaces of said preform in side-by-side relationship, the longitudinal axes of said tubes being parallel to the longitudinal axis of said preform, heating said die to an elevated temperature, said temperature being below the melting point of said tubes and said preform, internally pressurizing said tubes whereby said tubes expand against and into intimate contact with said opposing surfaces of said preform and with each other, and maintaining the temperature and pressure for a time sufficient for said tubes to diffusion bond to said skin layer preform and to each other thereby forming a blade having a plurality of spaced supports extending between and bonded to said opposing surfaces of said preform and defining passages therebetween.

7. A method of fabricating a hollow reinforced blade comprising the steps of:

providing a closed die having opposing die forming surfaces corresponding to the external configuration of said blade, providing a skin layer metal preform corresponding generally to the configuration of said die forming surfaces and having internally opposing surfaces, positioning said preform against said forming surfaces, inserting a plurality of preformed thin walled metal support members between said opposing surfaces of said preform, each of said support members generally defining a desired void area configuration within said preform, heating said die to an elevated temperature, said temperature being below the melting point of said support members and said preform, internally pressurizing said support members whereby said support members expand against and into intimate contact with said opposing surfaces of said preform, and maintaining the temperature and pressure for a time sufficient for said support members to diffusion bond to said skin layer preform thereby forming a blade having a plurality of spaced supports extending between and bonded to said opposing surfaces of said preform with said support members forming at least a portion of said supports and defining passages therebetween.

8. A method of fabricating a hollow reinforced blade comprising the steps of:

providing a closed die having opposing die forming surfaces corresponding to the external configuration of said blade, providing a skin layer metal preform corresponding generally to the configuration of said die forming surfaces and having internally opposing surfaces, positioning said preform against said forming surfaces, inserting a plurality of thin walled metal tubes having sealed ends between said opposing surfaces of said preform, the longitudinal axes of said tubes being parallel to the longitudinal axis of said preform, said ends being constrained by said die, heating said die to an elevated temperature, said temperature being below the melting point of said tubes and said preform, said tubes containing a substance characterized by a substantial increase in volume on heating to said elevated temperature whereby said tubes expand against and into intimate contact with said opposing surfaces of said preform, maintaining the temperature and pressure for a time sufficient for said tubes to diffusion bond to said skin layer preform thereby forming a blade having a plurality of spaced supports extending between and bonded to said opposing surfaces of said preform with said tubes forming at least a portion of said supports and defining passages therebetween, and removing said blade from said die and puncturing said sealed ends to remove said substance.

9. The method of claim 8 wherein said substance is water.

10. The method of claim 8 wherein said substance is lithium chloride.

References Cited

UNITED STATES PATENTS

| | | | |
|---|---|---|---|
| 2,764,803 | 10/1956 | Lampton et al. | 29—421 X |
| 2,825,794 | 3/1958 | Stalker | 29—156.8 H X |
| 2,828,533 | 4/1958 | Fromson | 29—157.3 V |
| 3,201,861 | 8/1965 | Fromson et al. | 29—421 X |

JOHN F. CAMPBELL, Primary Examiner

D. C. REILEY, Assistant Examiner

U.S. Cl. X.R.

29—157.3 V, 421, 472.3, 493